Jan. 6, 1948.  G. V. JAKEWAY ET AL  2,433,993
HARDWARE ARTICLE
Filed Sept. 25, 1944
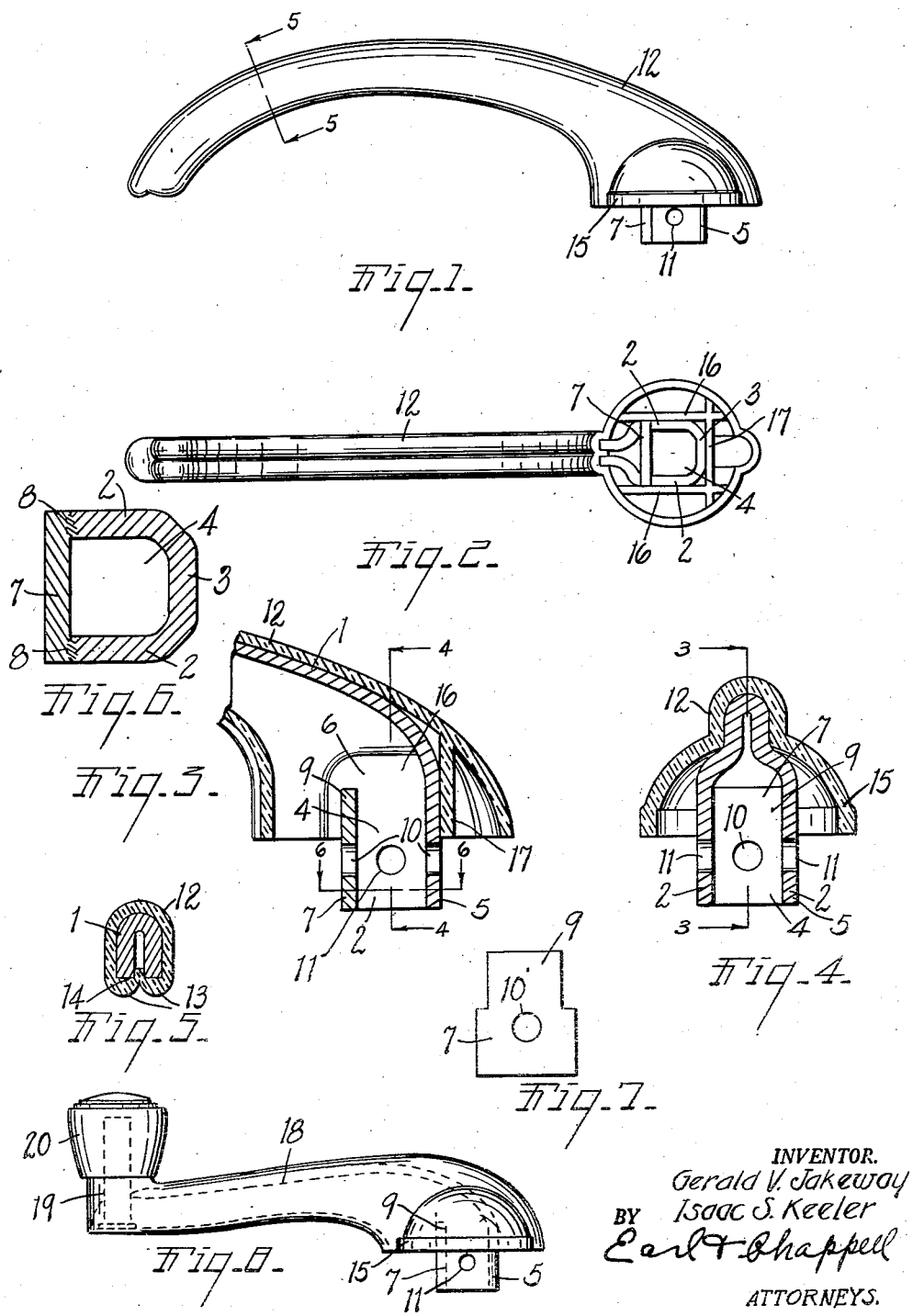
INVENTOR.
Gerald V. Jakeway
Isaac S. Keeler
BY Earl F. Chappell
ATTORNEYS.

Patented Jan. 6, 1948 2,433,993

UNITED STATES PATENT OFFICE 2,433,993

HARDWARE ARTICLE

Gerald V. Jakeway and Isaac S. Keeler, Grand Rapids, Mich., assignors to Keeler Brass Company, Grand Rapids, Mich., a corporation of Michigan Application September 25, 1944, Serial No. 555,658

2 Claims. (Cl. 292—347)

This invention relates to improvements in hardware articles.

The main objects of this invention are:

First, to provide a hardware article such as door handles, drawer, remote controls and the like which is very attractive in appearance, strong, and durable, and may be economically produced.

Second, to provide a hardware article of the type described which has no exposed metal parts to require plating or other finishing.

Objects relating to details and economies of the invention will appear from the description to follow. The invention is defined and pointed out in the claims.

Preferred embodiments of the invention are illustrated in the accompanying drawing, in which:

Fig. 1 is a side elevation of an automobile door handle embodying our invention.

Fig. 2 is an inverted view thereof.

Fig. 3 is an enlarged fragmentary section on line 3—3 of Fig. 4.

Fig. 4 is a transverse section on line 4—4 of Fig. 3.

Fig. 5 is a transverse section on line 5—5 of Fig. 1.

Fig. 6 is an enlarged detail view on line 6—6 of Fig. 3 showing details of the spindle socket.

Fig. 7 is a plan view of one of the socket wall members.

Fig. 8 is a side elevation of a remote control embodying our invention.

Our present invention relates to the type of hardware illustrated in the Jakeway Patent 2,342,402 issued February 22, 1944, and is an embodiment and in some respects an improvement upon the invention there disclosed and claimed.

In the embodiment of the present invention illustrated in the accompanying drawing, a metallic core member 1 is provided fabricated as a stamping and of generally channel or U-section providing spaced side walls or flanges. This stamping has a base end portion constituting a spindle attaching means conformed to provide side walls 2, 2 and rear wall 3 of a spindle socket 4. The core member is formed to provide a projecting socket portion 5, the walls of the core member being conformed at 6 so that the spindle may extend well into the handle.

A separate front wall member 7 is secured to the front of the socket side walls 2 by welding as indicated at 8 in Fig. 6. The tongue-like portion 9 of the wall member 7 extends between the side walls of the core member. This provides a very rigid core member including the spindle socket. Holes 10 and 11 are provided in the socket portion 5 to receive spindle retaining pins.

The casing 12 is formed of premolded thermoplastic material. "Tenite" is found very suitable for this purpose but there are other moldable thermoplastic materials which may be used.

The casing 12 is of channel section or general U-shape and internally conformed throughout the major portion of its length to embrace the core member as shown in Fig. 5, the edges 13 of the casing being folded or conformed around the edges of the core member and disposed between the core member side walls or flanges as shown at 14. This may be accomplished by the method described in the Jakeway Patent 2,342,402 referred to.

The casing is provided with an enlarged circular portion 15 at the base thereof having longitudinal and transverse internal walls 16 and 17 closely and supportingly embracing the spindle socket walls 2, 2 and 3 of the core member. These partition members 16 and 17 are integral with the casing and serve as supports for the enlarged portion of the casing.

In the embodiment shown in Fig. 8, the core member indicated by the dotted lines 18 is conformed to the desired shape and dimensions for a remote control and carries a pintle 19 at its outer end for the knob 20. The structure is in general that described and this figure is included to show the adaptability of the invention.

The finished structures are very attractive in appearance. There are no exposed metal parts requiring plating or finishing and this results in a substantial saving in the matter of manufacture.

It will be appreciated that the casing may be colored to match interior trims or sometimes to provide desired color contrasts.

We have illustrated and described our improvements in embodiments which we have found to be highly practical. We have not attempted to illustrate or describe other adaptations of the invention as it is believed that this disclosure will enable those skilled in the art to embody or adapt the same as may be desired.

Having thus described our invention, what we claim as new and desire to secure by Letters Patent, is:

1. In a hardware article, the combination of a core member having a base end portion and being of inwardly facing channel section formed as a stamping providing spaced side walls and a connecting wall at the bight of the channel, the side and connecting walls of the core member being conformed and extended at the base end thereof to provide the side and rear walls of an inwardly projecting spindle socket, the connecting wall at the bight of the channel constituting the rear wall of the socket, a plate-like member constituting a front spindle socket wall disposed against and secured to the front edges of the projecting portions of the said socket side walls and having a portion disposed between the side walls of the core member, and a preformed casing of channel section formed of moldable thermoplastic material disposed upon said core member in embracing supported relation therewith with the edges of the casing member extended around and between the side walls of the core member, said casing having an enlarged circular base portion, such base portion having longitudinally and transversely disposed internal walls integral therewith and engaging the side and rear socket walls of said core member.

2. An article of the class described comprising a metallic core member having a base end portion and being of channel section providing spaced side walls and connecting wall at the bight of the channel, said side and connecting walls being conformed and extended at the base thereof to provide three walls of a spindle socket, the connecting wall at the bight of the channel constituting one of said spindle socket walls, a plate like member constituting a fourth additional spindle socket wall secured to said core member to complement said three socket walls thereof, and a hollow preformed casing member of channel section formed of thermoplastic material embracing said core member and said base end portion thereof, the edges of said casing member being extended around the edges of said side walls of the core member, said spaced walls and connecting wall at the bight of the channel in forming said three walls of the spindle socket projecting integrally from the core member for a substantial distance exterior to said casing member of thermoplastic material to facilitate exteriorly of said casing member fixedly securing a spindle directly to integral portions of said side and connecting walls of the core member.

GERALD V. JAKEWAY.
ISAAC S. KEELER.

REFERENCES CITED

The following references are of record in the file of this patent:

UNITED STATES PATENTS

| Number | Name | Date |
|---|---|---|
| 2,290,807 | Keeler et al. | July 21, 1942 |
| 2,293,630 | Ruppel | Aug. 18, 1942 |
| 2,327,904 | Keeler et al. | Aug. 24, 1943 |
| 2,342,401 | Jakeway et al. | Feb. 22, 1944 |
| 2,342,402 | Jakeway | Feb. 22, 1944 |
| 2,342,403 | Jakeway (2) | Feb. 22, 1944 |
| 2,342,404 | Jakeway (3) | Feb. 22, 1944 |
| 2,342,405 | Johnson | Feb. 22, 1944 |